US011194800B2

(12) United States Patent
Gulwani et al.

(10) Patent No.: US 11,194,800 B2
(45) Date of Patent: Dec. 7, 2021

(54) PARALLEL SEARCH IN PROGRAM SYNTHESIS

(71) Applicant: Microsoft Technology Licensing, LLC, Redmond, WA (US)

(72) Inventors: Sumit Gulwani, Sammamish, WA (US); Abhishek Udupa, Bellevue, WA (US); Michael Vollmer, Bloomington, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 15/963,590

(22) Filed: Apr. 26, 2018

(65) Prior Publication Data
US 2019/0332704 A1    Oct. 31, 2019

(51) Int. Cl.
*G06F 16/245* (2019.01)
*G06F 16/2453* (2019.01)
*G06F 9/50* (2006.01)
*G06N 20/00* (2019.01)

(52) U.S. Cl.
CPC ...... *G06F 16/24532* (2019.01); *G06F 9/5027* (2013.01); *G06N 20/00* (2019.01)

(58) Field of Classification Search
CPC .. G06F 16/24532; G06F 9/5027; G06N 20/00
See application file for complete search history.

(56) References Cited

U.S. PATENT DOCUMENTS

| 5,437,032 A * | 7/1995 | Wolf ............... G06F 9/4881 718/103 |
| 8,302,097 B2 * | 10/2012 | Buco ............... G06Q 10/06 718/102 |
| 9,817,866 B1 * | 11/2017 | Barrett ............... H03M 7/00 |
| 10,078,520 B1 * | 9/2018 | Chirayath Kuttan ....... G06F 9/5066 |
| 2002/0035451 A1 * | 3/2002 | Rothermel ........... G06F 30/00 703/1 |

(Continued)

OTHER PUBLICATIONS

Gulwani, S., "Automating String Processing in Spreadsheets Using Input-Output Examples", 38th Symposium on Principles of Programming Languages (PoPL '11), Jan. 26-28, 2011, Austin, TX, USA, (2011), 13 Pages.

(Continued)

*Primary Examiner* — Alford W Kindred
*Assistant Examiner* — Tiffany Thuy Bui
(74) *Attorney, Agent, or Firm* — Schwegman Lundberg & Woessner, P.A.

(57) ABSTRACT

Systems, methods, and computer-executable instructions for parallel searching in program synthesis. A task to synthesize in a domain specific language (DSL) is received. The task is synthesized. Synthesizing the task includes generating sub-goals based on the task. The synthesized task includes a subset of the sub-goals. An estimated completion time for each of the sub-goals is expressed using the DSL is determined. The sub-goals are scheduled based on the estimated completion time. Some of the sub-goals are scheduled to be executed in parallel. The sub-goals are solved based on the scheduling to synthesize the task in the DSL. An elapsed real time to complete the synthesizing the task is reduced compared to scheduling the sub-goals in an order based on sub-goal generation.

17 Claims, 6 Drawing Sheets

(56) References Cited

U.S. PATENT DOCUMENTS

| | | | | | |
|---|---|---|---|---|---|
| 2003/0179241 | A1* | 9/2003 | Nonaka | ............... | G06Q 10/06 715/779 |
| 2005/0066330 | A1* | 3/2005 | Kanai | ............... | G06F 1/3275 718/102 |
| 2007/0220525 | A1* | 9/2007 | State | ............... | G06F 8/451 718/107 |
| 2010/0241884 | A1* | 9/2010 | Barsness | ............... | G06F 1/329 713/322 |
| 2013/0211884 | A1* | 8/2013 | Kay | ............... | G06Q 10/103 705/7.42 |
| 2013/0326475 | A1* | 12/2013 | Gulwani | ............... | G06F 40/12 717/107 |
| 2015/0254211 | A1* | 9/2015 | Gulwani | ............... | G06F 40/103 715/256 |
| 2015/0254530 | A1* | 9/2015 | Gulwani | ............... | G06K 9/6261 382/187 |
| 2017/0239576 | A1* | 8/2017 | Hsiao | ............... | G06F 8/41 |
| 2018/0150298 | A1* | 5/2018 | Balle | ............... | G06F 11/3006 |
| 2018/0321971 | A1* | 11/2018 | Bahramshahry | ............... | G06F 9/5044 |
| 2020/0026580 | A1* | 1/2020 | Bahramshahry | ............... | G06F 9/4881 |
| 2020/0137151 | A1* | 4/2020 | Chi | ............... | H04L 67/327 |

OTHER PUBLICATIONS

Gulwani, S., "Programming by Examples (and its applications in Data Wrangling)", Microsoft Research, [online], Retrieved from the Internet: <URL: https://www.microsoft.com/en-us/research/wp-content/uploads/2016/12/pbe16.pdf>, (2016), 22 Pages.

Gulwani, S., "Spreadsheet Programming using Examples", Keynote at SEMS, (Jul. 2016), 31 Pages.

Gulwani, S., "Program Synthesis", In Foundations and Trends(r) in Programming Languages, Publishers Inc., Hanover, MA, (2017), 136 Pages.

Le, V., et al., "Interactive Program Synthesis", arXiv:1703.03539v1 [cs.PL] Mar. 10, 2017. (2017), pp. 1-13.

Polozov, O., et al., "FlashMeta: A Framework for Inductive Program Synthesis", Proceedings of the 2015 ACM Sigplan International Conference on Object-Oriented Programming, Systems, Languages, and Applications (OOPSLA '15), Oct. 25-30, 2015, Pittsburgh, PA, USA, (2015), pp. 107-126.

Singh, R., et al., "Transforming Spreadsheet Data Types using Examples", Proceedings of the 43rd Annual ACM SIGPLAN-SIGACT Symposium on Principles of Programming Languages (POPL'16), Jan. 20-22, 2016, St. Petersburg, FL, USA, (2016), pp. 343-356.

Mjayakumar, A. K., et al., "Neural-Guided Deductive Search for Real-Time Program Synthesis from Examples", In Proceedings of International Conference on Learning Representations, Published as a conference paper at ICLR 2018, Retrieved on: Feb. 13, 2018, pp. 1-15.

* cited by examiner

|   | A 402 | B 404 |
|---|---|---|
| 1 | JOHN GALT | GALT, JOHN |
| 2 | JOHN DOE | DOE, JOHN |
| 3 | MITCH MITCHELL | MITCHELL, MITCH |
| 4 | JOHN HENRY BONHAM | HENRY BONHAM, JOHN |
| 5 | KEITH MOON | MOON, KEITH |
| 6 | ERIC CARR | CARR, ERIC |
| 7 | TOMMY RAMONE | RAMONE, TOMMY |
| 8 | TIM "HERB" ALEXANDER | "HERB" ALEXANDER, TIM |

*FIG. 4*

PARALLEL SEARCH IN PROGRAM SYNTHESIS

BACKGROUND

Program Synthesis systems synthesize a program from a given Domain Specific Language (DSL), starting from a given specification. The synthesis process involves taking a "goal" for synthesis and then recursively decomposing that goal into "sub-goals." The idea is that the solution for the top-level goal can be easily computed, given the solution to the sub-goals. These sub-goals may themselves be recursively decomposed into further sub-goals and so on. Often, the sub-goals can be solved for independently. However, naively spawning a new thread of execution for each sub-goal can overwhelm the available computing resources, especially if the computational effort required to solve a sub-goal is small, compared to the overhead of creating a new thread of execution.

BRIEF DESCRIPTION OF DRAWINGS

FIG. 4 is a portion of an example spreadsheet application that incorporates a parallelized synthesizer in accordance with respective examples.

DETAILED DESCRIPTION

Synthesizing a program to accomplish a task includes decomposing the task into sub-tasks, e.g., sub-goals. Sub-goals may also be decomposed into additional sub-goals in a recursive manner. As these sub-goals may be executed independently of one another, the sub-goals may be executed in parallel on separate processing cores and/or CPUs. Scheduling of the sub-goals, therefore, is needed. In an embodiment, a machine learning model is trained using serialized sub-goals and measured execution time to predict execution times of other sub-goals. The predicted execution times may then be used to schedule sub-goals during program synthesis across the available processing cores and/or CPUs in a more efficient manner in regard to the wall-clock time, e.g., elapsed real time. The wall-clock time is the time taken from the start of a program to the end of the program, which is the difference between the time a program finishes and the time at which the program started. In this manner, the described techniques achieve a variety of technical advantages including, but not limited to, decreasing the wall-clock time to synthesize a program to do a task, conserving memory, and reducing processor load.

Figure 1:
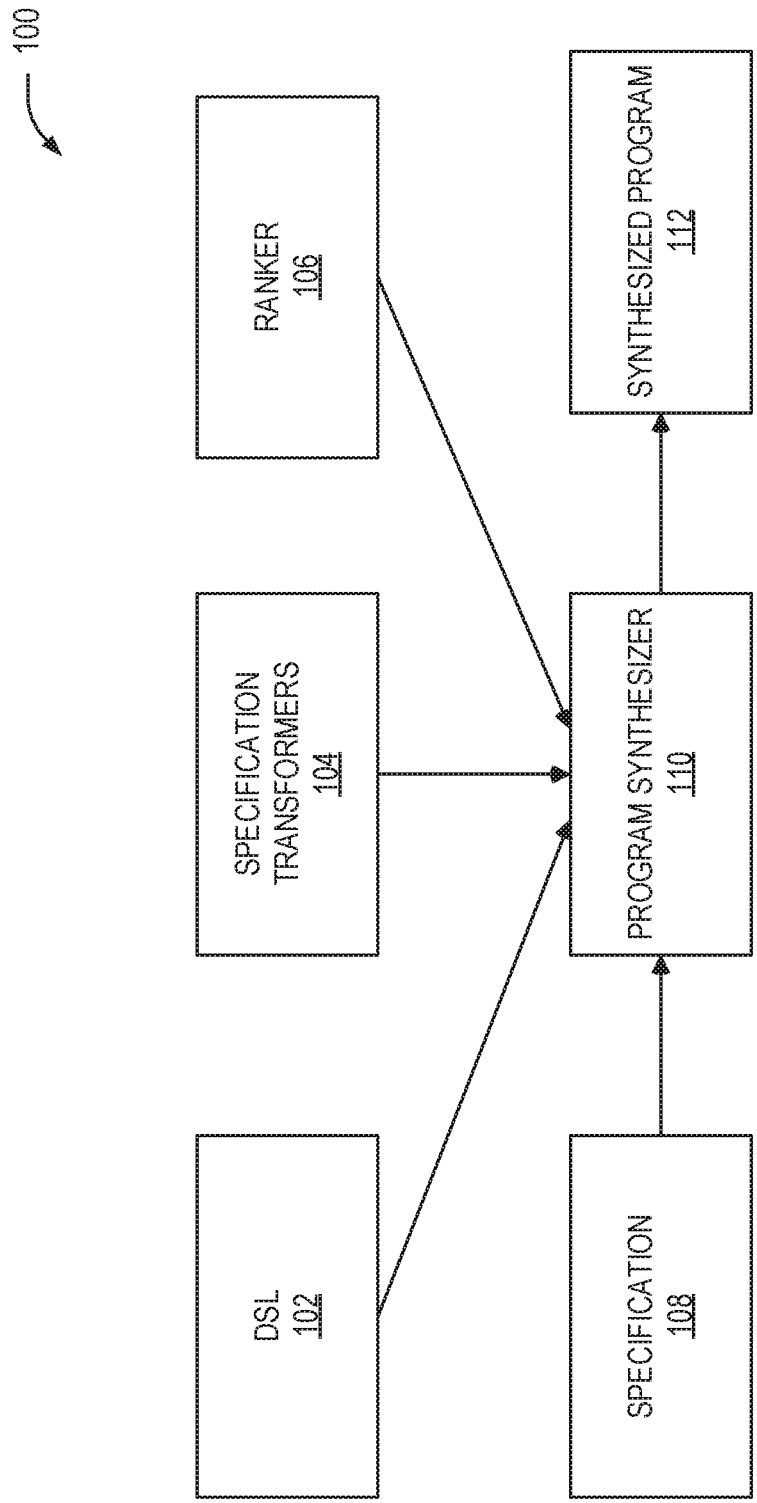
FIG. 1 is a block diagram of a program synthesis system in accordance with respective examples.

FIG. 1 is a block diagram of a program synthesis system 100 in accordance with respective examples. A domain-specific language (DSL) 102 describes a space of programs that a program synthesizer 110 searches in synthesizing a program. The DSL 102 may include terminal symbols and non-terminal symbols. A terminal symbol expands to one or more grammar symbols or operator applications, whose arguments might themselves by grammar symbols. Terminal symbols are symbols that cannot be expanded further. The DSL 102 may also include function symbols. Function symbols have well-defined and computable semantics. An example DSL is shown below in TABLE 1 and is a DSL that performs text transformations. Programs in this DSL take as input a list of strings and produce a single string as the output.

TABLE 1

| | | |
|---|---|---|
| string *start* | := | *e*; |
| string *e* | := | *f* |
| | | \| CONCAT(*f,e*); |
| string *f* | := | CONSTSTR(*s*) |
| | | \| let *x* : string = *input*[*idx*] in *ss*; |
| string *ss* | := | *x* \| SUBSTRING(*x,pp*); |
| (int, int) *pp* | := | (*pos, pos*); |
| int *pos* | := | *k* |
| | | \| REGEXPOS(*x, r, r, k*); |
| int *k, idx*; | | |
| regex *r*; | | |
| string *s*; | | |
| string[ ] *input*; | | |

The identifiers in TABLE 1 that are in italics represent terminal or non-terminal symbols. The identifiers in all capitals are function symbols. For instance, the symbols CONCAT, CONSTSTR, SUBSTRING, and REGEXPOS are function symbols.

The DSL in TABLE 1 symbolically and compactly represents a set of programs. Any program that is obtained by the following steps belongs to the DSL.

1. Start with the symbol start.
2. Repeat until no symbols other than input and function symbols remain:
   a. Select a terminal or non-terminal symbol, e.g., start.
   b. If the chosen symbol is a terminal symbol, then replace the symbol with a value. For example, if the chosen symbol is k, then an integer, e.g., 42, may be selected based on the "int k" definition. For the symbol s, s may be replaced with a string, e.g., "foo", based on "string s."
   c. If the chosen symbol is a non-terminal, then replace the symbol with an allowed expansion. For example, if the chosen symbol is ss, then the symbol may be replaced with either x or the program fragment let x: string=input[idx] in ss the symbols idx and ss will then be expanded in subsequent iterations.

To synthesize a program, a specification 108 is provided as input. The specification 108 describes the behavior of the desired program. The specification 108 may include a small number of input and output examples. The small number of examples may be one, two, three, etc. The specification 108 may include fragments of formal logic rather than input and output examples. In an example, a spreadsheet application may include rows of data. Data from one or more columns may be used as input-output examples.

FIG. 4 is an example spreadsheet application that incorporates a parallelized synthesizer in accordance with respective examples. In this example, a column A 402 includes data of people's names. A user may want to reformat the data to in the form "last name, first name." Data in column A 402 and column B 404 from rows 410 and 412 may be used as the input/output examples for a specification to synthesize a program. For example, "John Galt" is mapped to the output "Galt, John." Using this specification, a program may be synthesized. The synthesized program may then be run on the remainder of the data in the column A 402 with the output be placed in the column B 404. For example, row 420 includes data in the column B 404 that is from the synthesized program.

Returning to FIG. 1, the program synthesizer 110 uses one or more specification transformers 104 that generate possible prefixes of possible output. The program synthesizer 110 may generate programs by starting from the symbol start and expanding that symbol to e. The symbol e may be expanded to the function application CONCAT(f,e). The program synthesizer 110 may now generate sub-specifications for the symbols f and e appearing within the CONCAT operator. The specification transformer for CONCAT is used to generate the sub-specifications. The specification transformer for CONCAT knows the semantics of the CONCAT operator. In an example, the CONCAT specification transformer may generate the following specification for CONCAT's first argument: "John Galt"→"Galt, John"∨"Galt, Joh"∨"Galt, Jo", etc., where ∨ is the same as "or." In this example, the CONCAT may generate all possible prefixes of the possible output. The specification transformer for the second argument of the CONCAT function works in a similar way.

Following this example, the program synthesizer 110 has decomposed the problem of synthesizing "Galt, John" from "John Galt" into sub-goals at two levels. First, at the level of specifications for the symbols f and e, the first and second arguments to the CONCAT operation. Second, at the level of possible outputs, where a program for each possible prefix of the output "Galt, John" may be synthesized. The program synthesizer 110 may then repeat in a recursive manner on the symbols f and e until terminal symbols are reached. A ranker 106 is used to select sub-goals solutions to determine which solution to select as part of a synthesized program 112. The ranker 106 attempts to select the "best" program/sub-program.

The sub-goals generated by the program synthesizer 110 may be solved independently from one another. In addition, the program synthesizer 110 generates additional sub-goals as the program synthesizer 110 traverses through the grammar of the DSL 102. These additional sub-goals may be solved independently from the other sub-goals. The sub-goals may vary widely in the amount of computation resources required to solve the sub-goal. Accordingly, parallelizing the sub-goals by spawning a new thread of execution for each sub-goal would be inefficient. That is, the overhead of spawning a new thread of execution and scheduling the thread would negate the benefits obtained from processing the sub-goal in parallel with other sub-goals. In an example, sub-goals may be scheduled in parallel across time, when to process a sub-goal, and computing resources, which CPU, processing core, or execution thread to map the processing of the sub-goal.

Figure 2:
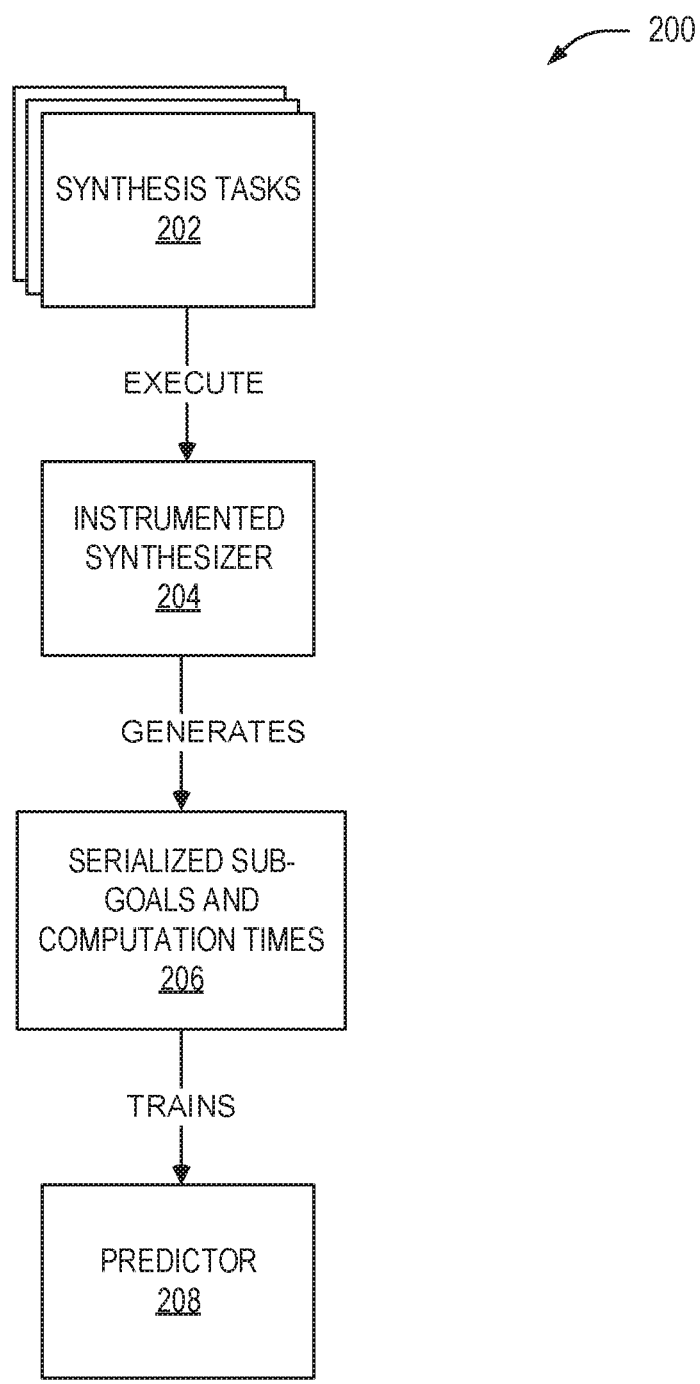
FIG. 2 is a block diagram of system for training a predictor to estimate completion time of synthesized sub-goals in accordance with respective examples.

To make scheduling decision, an accurate estimate of the amount of computation involved to process of sub-goal is used. A machine learning model may be used to estimate the amount of computation required to process of sub-goal. FIG. 2 is a block diagram of system for training a predictor to estimate completion time of synthesized sub-goals in accordance with respective examples. The machine learning model may be trained using various synthesis tasks 202 for a DSL and logging the sub-goals along with how much time the sub-goal took to be solved when synthesizing the synthesis tasks 202. The logging may also include the level of recursion of the sub-goal, the input of the sub-goal, the output of the sub-goal, the computing resources used to execute the sub-goal, and how much memory was used in solving the sub-goal. The logged sub-goals may be used to train the machine learning model.

In the system, the synthesis tasks 202 are executed on an instrumented synthesizer 204. The instrumented synthesizer 204 synthesizes a program but also serializes and logs sub-goals. For each generated sub-goal, the sub-goal may be serialized and the computation time to execute the sub-goal 206 may be logged. In an example, the sub-goal is serialized by writing a text representation of the sub-goal to disk. The serialized sub-goals and computation time may be used as the training data set for a predictor 208. In an example, the predictor 208 is a machine learning algorithm, such as a neural network, decision tree, linear regression, etc. The serialized sub-goals and computation times 206 may be used to train the predictor 208. In an example, the serialized sub-goals are the input and the predictor 208 learns a corresponding computation time. Once trained, the predictor 208 estimates the computation time for any sub-task within a DSL. The predictor 208 may also provide an estimate for the amount of memory needed to solve a sub-goal. Output from the predictor 208 may be used to schedule sub-tasks.

Figure 3:
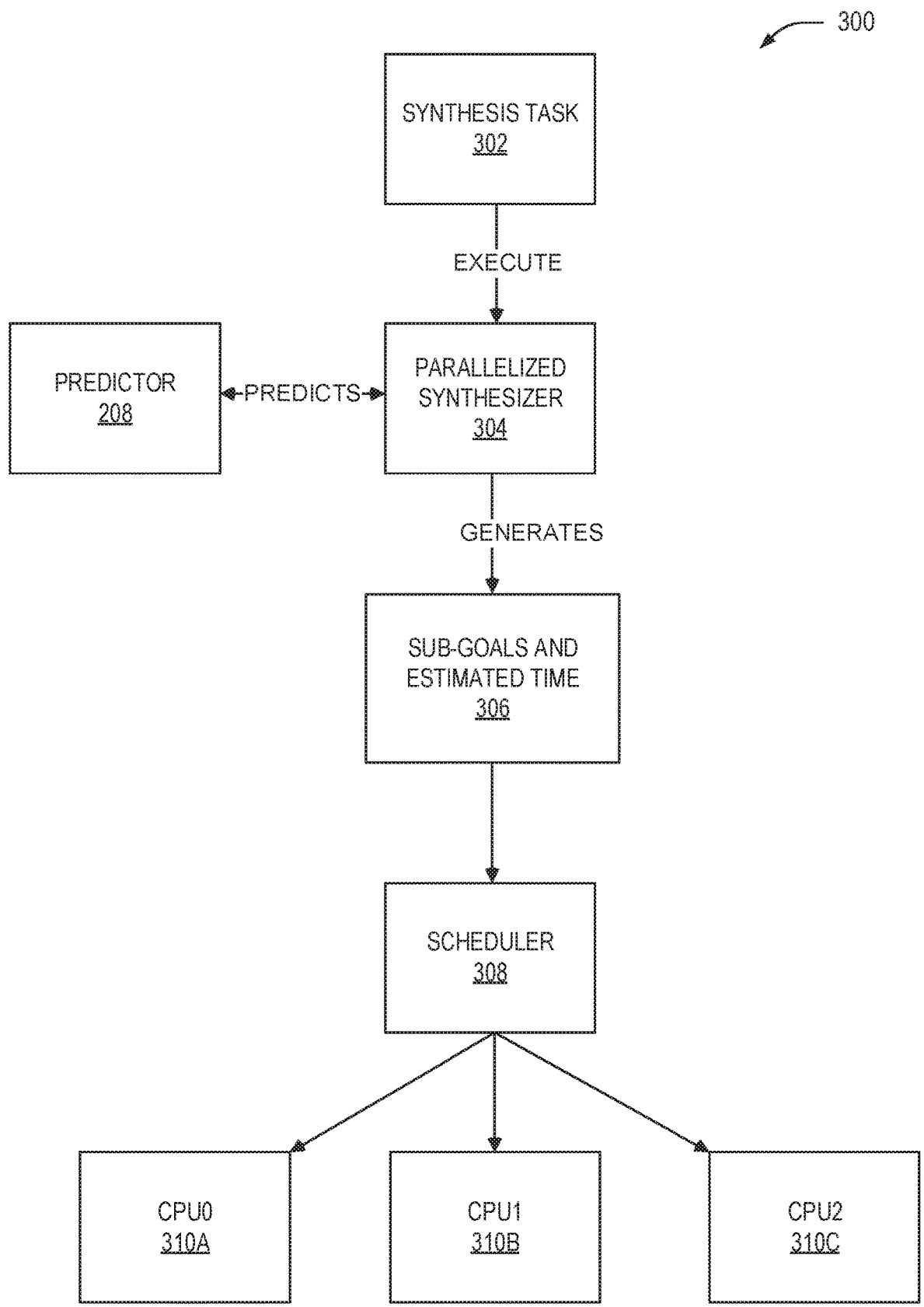
FIG. 3 is a block diagram of a parallelized synthesizer system in accordance with respective examples.

FIG. 3 is a block diagram of a parallelized synthesizer system 300 in accordance with respective examples. A synthesis task 302 is received. As noted above, the synthesis task 302 may include a specification that indicates how the synthesized program should act. The program that accomplishes the synthesis task 302 will be synthesized in the same DSL as used by the synthesis tasks 202 that were used to train the predictor 208. The synthesis task 302 is provided to a parallelized synthesizer 304. The parallelized synthesizer 304 synthesizes a program as explained above. That is, the parallelized synthesizer 304 expands symbols using specification transformers and decomposes the synthesis task into various sub-goals. The parallelized synthesizer 304 produces both the sub-goals for execution along with additional scheduling data that is used to schedule the sub-goals. For example, the parallelized synthesizer 304 may produce sub-goals and an estimated time to compute each of the sub-goals 306 as the scheduling information. The scheduling information may be retrieved from the predictor 208. For example, the instrumented synthesizer 204 may serialize a sub-goal. The serialized sub-goal may then be used as input to the predictor 208, which returns the estimated scheduling information, such as the estimated computation time to solve the input sub-goal.

A scheduler 308 may then schedule the sub-goals using the scheduling information. For example, the scheduler 308 may use a shortest job first, longest job, first, etc., scheduling algorithm to schedule the sub-goals across computation resources, such as CPUs 310A, 310B, and 310C. The scheduler 308 may also schedule sub-goals across threads, computation cores, CPUs, or a combination of these resources. The scheduling information may include or may also include other information such as the amount of memory needed to solve a sub-goal. This scheduling information may also be used by the scheduler 308 to schedule sub-goals for execution.

Figure 5:
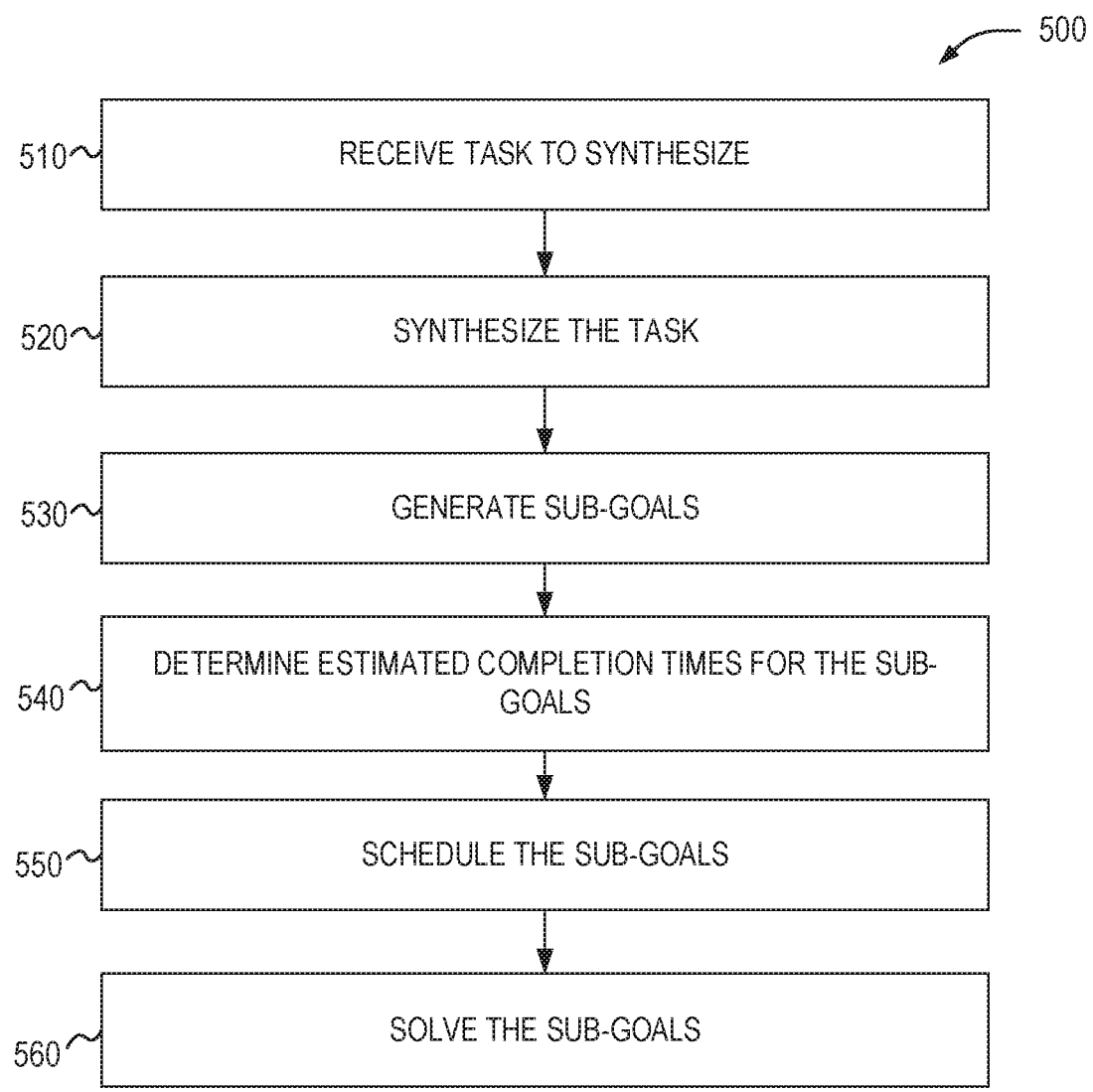
FIG. 5 is a flow diagram of a process for scheduling sub-goals in program synthesis in parallel in accordance with respective examples.

FIG. 5 is a flow diagram of a process 500 for scheduling sub-goals in program synthesis in parallel in accordance with respective examples. The process 500 may be executed on a computing device. At 510, a task to synthesize in a DSL is received. The task may be provided as a specification as to how the synthesized program should work. In an example, the specification includes one or more input and output examples. At 520, a program to accomplish the task is synthesized. As part of the synthesizing, at 530 sub-goals are generated. The sub-goals break down the task into smaller components. The final synthesized program will be made of a combination of solved sub-goals that match the provided task. To determine which sub-goals are part of the synthesized program, the sub-goals are solved. Some solved sub-goals may generate the same output from the input. In these cases, a ranker may be used to determine which sub-goal is selected. For example, the ranker may rank the solved sub-goals based on the length of the solved sub-goals. In an example, the smaller the solved sub-goal is, the higher ranking the solved sub-goal.

Before the sub-goals are solved, the sub-goals are scheduled. At 540, for each of the sub-goals an estimated completion time is determined. In an example, a machine learning model is used to determine the completion time. The sub-goal may be provided as the input to the model. The sub-goal may be serialized into a text form that is provided to the model. In addition, the level of recursion may also be provided as part of the input. At 550, the sub-goals are scheduled for solving based on the determined completion time. In an example, scheduling algorithms such as shortest job first, longest job first, etc., may be used to schedule the sub-goals based on the completion time. At 560, the sub-goals are solved based on the schedule. Some of the sub-goals are solved in parallel to one another across CPUs, processing cores, threads, etc. Solving a sub-goal includes determining a program or sub-program that matches the specification or sub-specification. The various selected sub-programs that are generated as part of synthesizing are combined into the synthesized program for the task. The scheduling of the sub-goals is done to reduce the wall-clock time to complete the synthesizing. Without the scheduling, the sub-goals could be solved for in the order they are generated during the synthesizing. This scheduling, however, does not efficiently use the computing resources and leads to longer synthesizing times.

Figure 6:
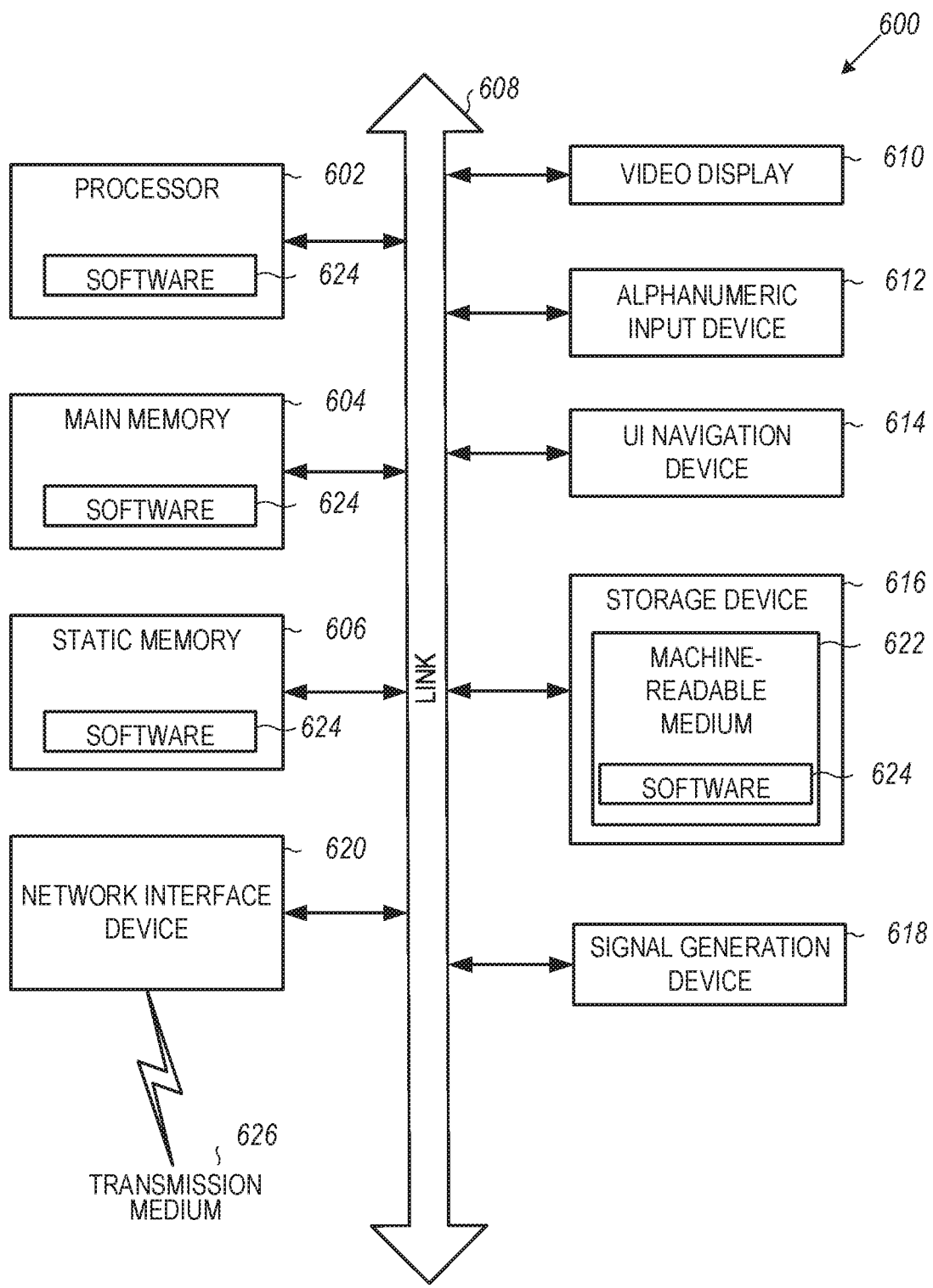
FIG. 6 is an example computing device that can be used in conjunction with the technologies described herein.

FIG. 6 is an example computing device that can be used in conjunction with the technologies described herein. In alternative embodiments, the computing device 600 may operate as a standalone device or may be connected (e.g., networked) to other computing devices. In a networked deployment, the computing device 600 may operate in the capacity of a server communication device, a client communication device, or both in server-client network environments. In an example, the computing device 600 may act as a peer computing device in peer-to-peer (P2P) (or other distributed) network environment. The computing device 600 may be a personal computer (PC), a tablet PC, a set top box (STB), a personal digital assistant (PDA), a mobile telephone, a smart phone, a web appliance, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may implement the parallelized the instrumented synthesizer 204, the predictor 208, the parallelized synthesizer 304, the scheduler 308, and perform the method of FIG. 5.

Computing device 600 may include a hardware processor 602 (e.g., a central processing unit (CPU), a graphics processing unit (GPU), a hardware processor core, or any combination thereof), a main memory 604 and a static memory 606, some or all of which may communicate with each other via a link (e.g., bus) 608. The computing device 600 may further include a display unit 610, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera a panoramic or high-resolution camera), physical keyboard, trackball, or other input devices.

The computing device 600 may additionally include a storage device (e.g., drive unit) 616, a signal generation device 618 (e.g., a speaker, a projection device, or any other type of information output device), a network interface device 620, and one or more sensors, such as a global positioning system (GPS) sensor, compass, accelerometer, motion detector, or other sensor. The computing device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a computing-readable (or machine-readable) storage media 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the computing device 600. In an example, one or any combination of the hardware processor 602, the main memory 604, the static memory 606, or the storage device 616 may constitute computing device (or machine) readable media.

While the computer-readable storage media 622 is illustrated as a single medium, a "computer-readable storage media" or "machine-readable storage media" may include a single medium or multiple media (e.g., a centralized or distributed database, and/or associated caches and servers) configured to store the one or more instructions 624.

In an example, a computer-readable storage media or machine-readable storage media may include any medium that is capable of storing, encoding, or carrying instructions for execution by the computing device 600 and that cause the computing device 600 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 620 may use the transfer protocols to transmit data using transitory propagating signals.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. In an example, a transmission medium may include any intangible medium that is capable of storing, encoding or carrying instructions for execution by the computing device 600, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for parallel scheduling in program synthesis, the method comprising operations performed using an electronic processor, the operations comprising:

receiving a task to synthesize in a domain specific language (DSL);
synthesizing the task, wherein synthesizing of the task comprises:
generating a plurality of independently executable multilevel sub-goals based on the task, wherein the synthesized task comprises a solved subset of the plurality of the sub-goals;
determining an estimated completion time for each of the plurality of sub-goals, wherein the estimated completion time is provided by a predictor trained using a plurality of training tasks in the DSL, wherein determining the estimated completion time for each of the plurality of sub-goals comprises serializing each of the plurality of subgoals, and wherein each of the plurality of sub-goals is expressed using the DSL;
scheduling the plurality of the sub-goals based on the estimated completion time, wherein at least two of the plurality of the sub-goals are scheduled to be executed in parallel; and
solving the plurality of sub-goals based on the scheduling to synthesize the task in the DSL, wherein an elapsed real time to complete the synthesizing the task is reduced compared to scheduling the sub-goals in an order based on sub-goal generation.

2. The method of claim 1, further comprising determining an estimated memory usage of each of the plurality of sub-goals, wherein scheduling the plurality of sub-goals is based on the estimate memory usage.

3. The method of claim 1, further comprising training the predictor using the plurality of training tasks in the DSL.

4. The method of claim 3, wherein training the predictor comprises:
for each of the plurality of training tasks:
generating a plurality of sub-tasks;
executing each of the plurality of sub-tasks, wherein an completion time is recorded; and
storing, for each of the plurality of sub-tasks, a representation of the sub-task and the completion time.

5. The method of claim 4, wherein the predictor is a neural network and the training trains the neural network to estimate the estimated completion time of a sub-task.

6. The method of claim 1, wherein the some of the plurality of the sub-goals are scheduled to be executed in parallel are assigned to different central processing units.

7. The method of claim 1, wherein the some of the plurality of the sub-goals are scheduled to be executed in parallel are assigned to different processing cores of a central processing unit.

8. The method of claim 1, wherein receiving a task to synthesize comprises receiving a specification for the task.

9. A system for parallel scheduling of sub-goals, the system comprising:
an electronic processor configured to receive a task to synthesize in a domain specific language (DSL);
a computer-readable storage medium storing computer-executable instructions for execution by the electronic processor to implement:
a parallelized synthesizer configured to synthesize the task, wherein to synthesize the task the parallelized synthesizer is configured to:
generate a plurality of independently executable multilevel sub-goals based on the task, wherein the synthesized task comprises a subset of the plurality of the sub-goals; and determine an estimated completion time for each of the plurality of sub-goals, wherein the estimated completion time is provided by a predictor trained using a plurality of training tasks in the DSL, wherein determining the estimated completion time for each of the plurality of sub-goals comprises serializing each of the plurality of subgoals, and wherein each of the plurality of sub-goals is expressed using the DSL; and a scheduler configured to schedule the plurality of the sub-goals based on the estimated completion time, wherein some of the plurality of the sub-goals are scheduled to be executed in parallel on computing resources, and wherein an elapsed real time to complete the task synthesis is reduced compared to the sub-goals executed in an order based on sub-goal generation.

10. The system of claim 9, further comprising computing resources configured to solve the plurality of sub-goals based on the scheduling to synthesize the task in the DSL.

11. The system of claim 9, wherein the parallelized synthesizer is further configured to determine an estimated memory usage of each of the plurality of sub-goals, wherein the scheduler is configured to use the estimate memory usage to schedule the plurality of sub-goals.

12. The system of claim 9, wherein the electronic processor is further configured to
train the machine learning model on a plurality of training tasks in the DSL.

13. The system of claim 12, wherein to train the machine learning model, the electronic processor predictor is configured to:
for each of the plurality of training tasks:
generate a plurality of sub-tasks;
execute each of the plurality of sub-tasks, wherein an completion time is recorded; and
store, for each of the plurality of sub-tasks, a representation of the sub-task and the completion time.

14. A computer-readable storage medium storing computer-executable instructions for parallel scheduling of sub-goals, the stored instructions comprising:
instructions to receive a task to synthesize in a domain specific language (DSL);
instructions to synthesize the task, wherein the instructions to synthesize the task comprise:
instructions to generate a plurality of independently executable multilevel sub-goals based on the task, wherein the synthesized task comprises a subset of the plurality of the sub-goals; and
instructions to determine an estimated completion time for each of the plurality of sub-goals, wherein the estimated completion time is provided by a predictor trained using a plurality of training tasks in the DSL, wherein determining the estimated completion time for each of the plurality of sub-goals comprises serializing each of the plurality of subgoals, and wherein each of the plurality of sub-goals is expressed using the DSL; and
instructions to schedule the plurality of the sub-goals based on the estimated completion time, wherein some of the plurality of the sub-goals are scheduled to be executed in parallel on computing resources, and wherein an elapsed real time to complete the task synthesis is reduced compared to the sub-goals executed in an order based on sub-goal generation.

15. The computer-readable storage medium of claim 14, further comprising instructions to solve the plurality of sub-goals based on the scheduling to synthesize the task in the DSL.

16. The computer-readable storage medium of claim 14, further comprising instructions to determine an estimated memory usage of each of the plurality of sub-goals, wherein estimated memory is used to schedule the plurality of sub-goals.

17. The computer-readable storage medium of claim 14, wherein the instructions further comprise:
instructions to train the machine learning model on a plurality of training tasks in the DSL.

* * * * *